US008970622B2

(12) United States Patent
Amkraut et al.

(10) Patent No.: US 8,970,622 B2
(45) Date of Patent: Mar. 3, 2015

(54) SYSTEM AND METHOD FOR PLACING OBJECTS ACROSS A SURFACE OF A GRAPHICS OBJECT

(75) Inventors: Susan Amkraut, Palo Alto, CA (US); Ian A. Nies, San Francisco, CA (US); Kelcey Simpson, Austin, TX (US); Michael Girard, Palo Alto, CA (US); Carl-Mikael Lagnecrantz, Stockholm (SE)

(73) Assignee: AUTODESK, Inc., San Rafael, CA (US)

( * ) Notice: Subject to any disclaimer, the term of this patent is extended or adjusted under 35 U.S.C. 154(b) by 188 days.

(21) Appl. No.: 13/563,576

(22) Filed: Jul. 31, 2012

(65) Prior Publication Data
US 2013/0033492 A1 Feb. 7, 2013

Related U.S. Application Data

(60) Provisional application No. 61/513,985, filed on Aug. 1, 2011.

(51) Int. Cl.
*G09G 5/00* (2006.01)
*G06T 19/20* (2011.01)

(52) U.S. Cl.
CPC ......... *G06T 19/20* (2013.01); *G06T 2219/2004* (2013.01)
USPC ............ 345/629; 345/418; 345/419; 345/619

(58) Field of Classification Search
CPC .......... G09G 5/14; G09G 5/393; G06T 17/20; G06T 17/205; G06T 17/00; G06T 19/00; G06T 15/005; G06T 15/04; G06T 19/20; G06T 2219/2004

USPC .......... 345/418, 419, 423, 629, 473, 474, 619
See application file for complete search history.

(56) References Cited

U.S. PATENT DOCUMENTS

| | | | |
|---|---|---|---|
| 2009/0306946 A1 | 12/2009 | Badler et al. | |
| 2010/0091018 A1 | 4/2010 | Tatarchuk et al. | |
| 2010/0134500 A1 | 6/2010 | Chang | |
| 2010/0141666 A1 | 6/2010 | Christopher et al. | |
| 2010/0299065 A1* | 11/2010 | Mays | 701/209 |

(Continued)

OTHER PUBLICATIONS

Reynolds C. W.: Flocks, herds, and schools: A distributed behavioral model. Proc. SIGGRAPH 87, Computer Graphics 21, 4 (Jul. 1987), 25-34.

(Continued)

*Primary Examiner* — Chante Harrison
(74) *Attorney, Agent, or Firm* — Patterson & Sheridan, LLP

(57) ABSTRACT

One embodiment of the invention sets forth a technique for placing objects across a surface of a graphics object. The technique includes establishing a first plurality of grid points over the surface of the graphics object, wherein each grid point in the plurality of grid points is located either inside or outside the surface, establishing a second plurality of grid points that includes only grid points in the first plurality of grid points that are located inside the surface, marking each grid point in the second plurality of grid points as an eligible area or an ineligible area onto which objects can be placed, selecting from the second plurality of grid points a grid point that is marked as an eligible area, and placing an object onto the selected grid point.

20 Claims, 11 Drawing Sheets

(56) References Cited

U.S. PATENT DOCUMENTS

2010/0301555 A1* 12/2010 Jubinville et al. .............. 463/17
2011/0161060 A1 6/2011 Kim et al.

OTHER PUBLICATIONS

Shao W., Terzopoulos D.: Autonomous pedestrians., In Proc. Symposium on Computer Animation (2005), pp. 19-28.

Lee K. H., Choi M. G., Hong Q., Lee J.: Group behavior from video: a data-driven approach to crowd simulation, Proceedings of the 2007 ACM SIGGRAPH/Eurographics symposium on Computer animation, pp. 109-118.

Guy S. J., Chhugani J., Curtis S., Lin M. C., Dubey P., Manocha D.: Pledestrians: A least-effort approach to crowd simulation. In Symposium on Computer Animation (2010), ACM.

Van Den Berg J., Patil S., Sewall J., Manocha D., Lin M.: Interactive navigation of individual agents in crowded environments. Proc. of ACM Symposium on I3D (2008), 139-147.

Treuille A., Cooper S., Popovic Z.: Continuum crowds. Proc. of ACM SIGGRAPH (2006), 1160-1168.

Chenney S.: Flow tiles. Proc. 2004 ACM SIGGRAPH / Eurographics Symposium on Computer Animation (2004).

Guy S., Chhugani J., Kim C., Satish N., Lin, M. C., Manocha D., Dubey P.: Clearpath: Highly parallel collision avoidance for multi-agent simulation. Proc. of Symposium on Computer Animation (2009), 177-187.

Helbing D., Molnar P.: Social force model for pedestrian dynamics. Physical Review E 51 (May 1995), 4282.

Julien Pettré, Jan Ondřej, Anne-Hélène Olivier, Armel Crétual and Stéphane Donikian , Experiment-based Modeling, Simulation and Validation of Interactions between Virtual Walkers, Proceedings of the 2009 ACM SIGGRAPH/Eurographics Symposium on Computer Animation (SCA'09), 2009.

Jan Ondřej, Julien Pettré, Anne-Hélène Olivier and Stéphane Donikian, A Synthetic-Vision-Based Steering Approach for Crowd Simulation SIGGRAPH '10: ACM SIGGRAPH 2010 Papers, 2010.

Manfred Lau and James Kuffner. 2006. Precomputed Search Trees: Planning for Interactive Goal-Driven Animation: ACM SIGGRAPH / Eurographics Symposium on Computer Animation (SCA), 299-308.

Ulicny, B., Ciechomski, O., and Thalmann, D. 2004. Crowdbrush: Interactive authoring of real-time crowd scenes. In Proceedings of the 2004 ACM SIGGRAPH/Eurographics symposium on Computer animation, 243-252.

Sung, M., Gleicher, M., and Chenney, S. 2004. Scalable behaviors for crowd simulation. Computer Graphics Forum 23, 3, 519-528.

Mankyu Sung and Lucas Kovar and Michael Gleicher, 2005, Fast and accurate goal-directed motion synthesis for crowds, Proceedings of the 2005 ACM SIGGRAPH/Eurographics symposium on Computer animation.

Ju E., Choi M. G., Park M., Lee J., Lee K. H., Takahashi S.: Morphable crowds. ACM Trans. Graph. 29, 6 (2010), 140.

Non-final Office Action, U.S. Appl. No. 13/562,183, dated Apr. 24, 2014.

Non-final Office Action, U.S. Appl. No. 13/556,096, dated Sep. 26, 2014.

\* cited by examiner

SYSTEM AND METHOD FOR PLACING OBJECTS ACROSS A SURFACE OF A GRAPHICS OBJECT

CROSS-REFERENCE TO RELATED APPLICATIONS

This application claims the priority benefit of Provisional U.S. Patent Application Ser. No. 61/513,985, filed Aug. 1, 2011, entitled "Crowd Simulation with Object Avoidance," the subject matter of which is hereby incorporated herein by reference.

BACKGROUND OF THE INVENTION

1. Field of the Invention

The invention relates generally to the field of crowd simulation in computer software and, more specifically, to placing individuals and/or groups of individuals across a surface of a graphics object.

2. Description of the Related Art

Crowd simulation is the process of simulating a crowd having a large number of individuals placed in a computer-generated crowd area. Existing techniques for placing individuals within a computer-generated crowd area typically require a graphics designer to manually select locations within the crowd area where the individuals should be placed. This process is cumbersome, however, due to the ever-increasing size and complexity of crowd areas that are being employed (e.g., in video games and animated movies). For example, it is a challenging task for a graphics designer to place individuals across a crowd area that includes numerous obstacles, e.g., buildings, trees, poles, mailboxes, etc., each of which represents an invalid area for any individual to be placed. Moreover, it is difficult for the graphics designer to establish a natural diversity of individuals within the crowd area since attempting to do so requires the graphics designer to continually select from different types of individuals and to keep track of the numbers of types of individuals who have already been placed into the crowd area.

As the foregoing illustrates, what is needed in the art is an improved technique for placing individuals within a crowd area in computer-generated crowd simulation.

SUMMARY OF THE INVENTION

One embodiment of the invention sets forth a method for placing objects across a surface of a graphics object. The method includes the steps of establishing a first plurality of grid points over the surface of the graphics object, wherein each grid point in the plurality of grid points is located either inside or outside the surface, establishing a second plurality of grid points that includes only grid points in the first plurality of grid points that are located inside the surface, marking each grid point in the second plurality of grid points as an eligible area or an ineligible area onto which objects can be placed, selecting from the second plurality of grid points a grid point that is marked as an eligible area, and placing an object onto the selected grid point One advantage of the disclosed method is that individuals and/or groups of individuals are automatically distributed across a surface of a graphics object of any shape or form. A graphical preview displays in real-time how individuals and/or groups of individuals will be placed across the surface of the graphics object, and is dynamically updated in response to any changes in information on which placing the individuals and/or groups of individuals is based.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the invention. However, it will be apparent to one of skill in the art that the invention may be practiced without one or more of these specific details. In other instances, well-known features have not been described in order to avoid obscuring the invention.

Figure 1:
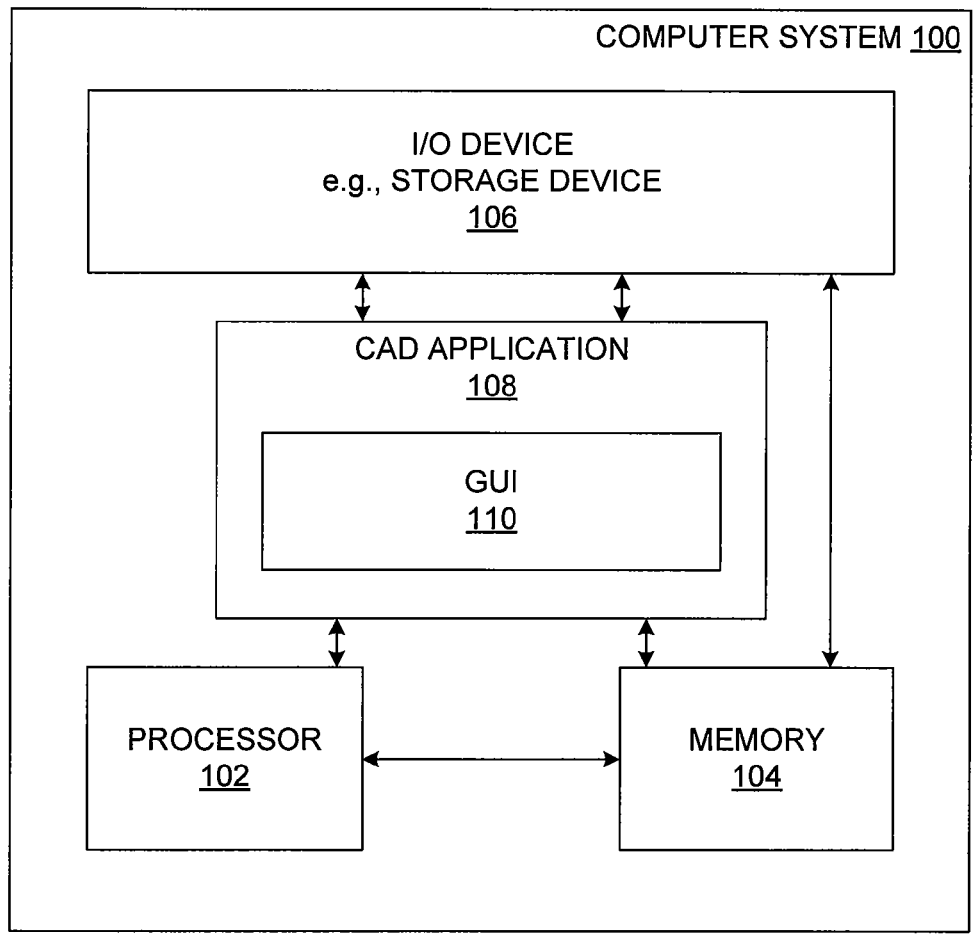
FIG. 1 is a block diagram of a system configured to implement one or more aspects of the invention.

FIG. 1 illustrates a conceptual block diagram of a general purpose computer system 100 configured to implement one or more aspects of the invention. As shown, computer system 100 includes processor 102 (e.g., a CPU), memory 104, e.g., random access memory (RAM) and/or read only memory (ROM), and various input/output devices 106, which may include storage devices including, but not limited to, a tape drive, a floppy drive, a hard disk drive or a compact disk drive, a receiver, a transmitter, a speaker, a display, a speech synthesizer, an output port, and a user input device such as a keyboard, a keypad, a mouse, and the like.

As shown in FIG. 1, computer system 100 is configured to execute CAD application 108, which includes a GUI 110, and is configured to execute an automatic distribution of individuals and/or groups of individuals across a surface, or an automatic distribution of the individuals and/or groups of individuals across particular regions of the surface, of a two-dimensional or a three-dimensional graphics object. In particular, and as described in further detail herein, CAD application 108 is configured to receive a graphics object of any shape or form—e.g., concave, convex, continuous, discontinuous—and then distribute individuals and/or groups of individuals across the surface of that graphics object. CAD application 108 is configured to analyze edges of the surface of the graphics object to ensure no individual or group of individuals is placed too closely to an edge of the surface, which helps prevent each individual and group of individuals, when subsequently animated, from exceeding the boundaries of the surface of the graphics object.

As is set forth in further detail below, CAD application 108 is configured to distribute individuals and/or groups of individuals based on various parameters. These parameters include, but are not limited to, a population density, a desired ratio of groups to individuals, a desired ratio of males to females, and/or orientations of individuals (e.g., a ration of individuals who talk to individuals who listen). CAD application 108 is also configured to generate a graphical preview that displays in real-time how individuals and/or groups of individuals will be placed across the surface of the graphics object. The graphical preview is dynamically updated in response to any changes in the information on which placing the individuals and/or groups of individuals is based, such as selecting a different graphics object, specifying specific regions within the surface of the graphics object where the individuals and/or groups of individuals should be placed, and updating any of the information and/or parameters described above.

Figure 2A:
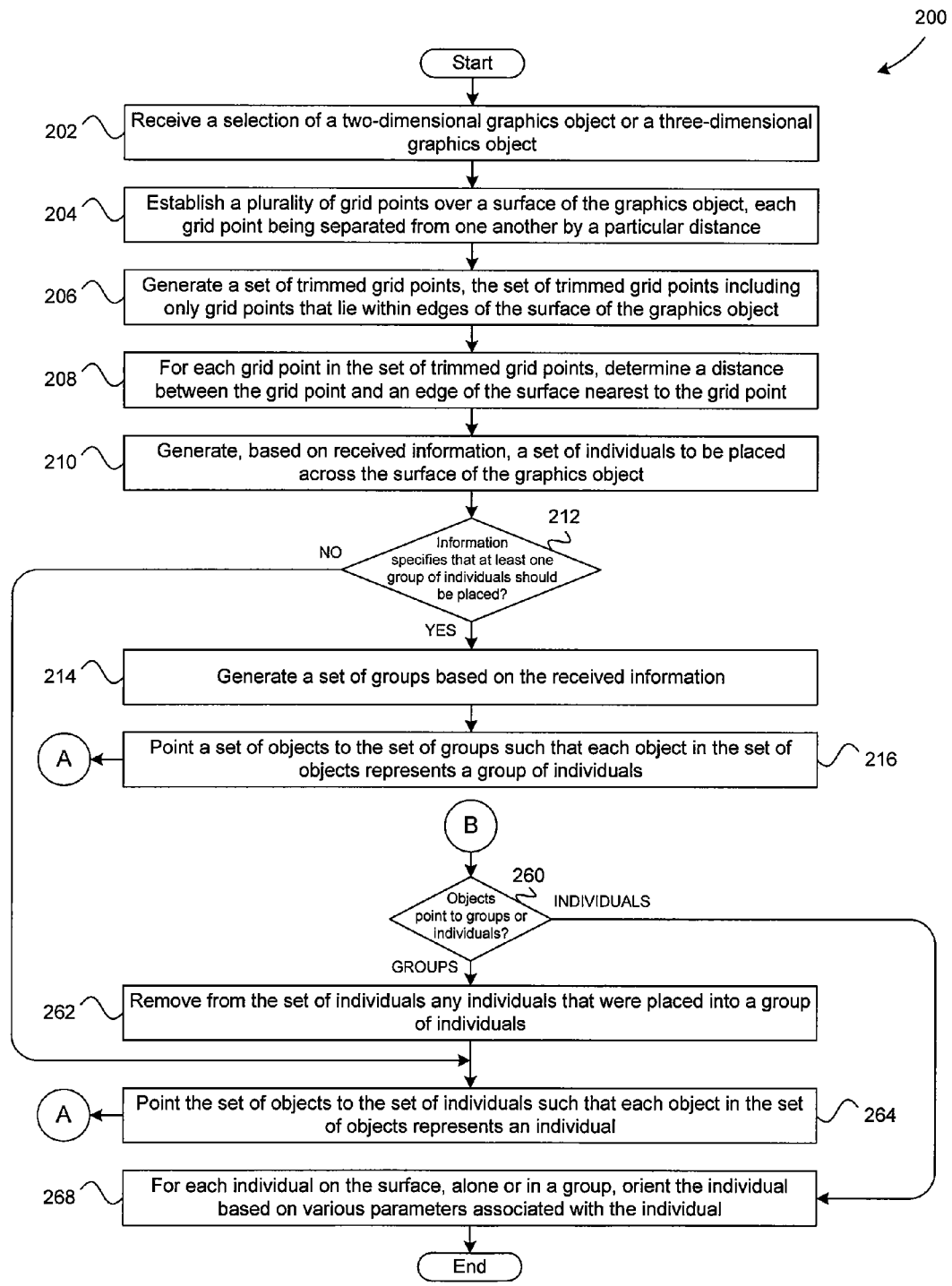
FIGS. 2A-2C illustrate a flow diagram of method steps for placing individuals and/or groups of individuals across a surface of a graphics object, according to one embodiment of the present invention.
Figure 2B:
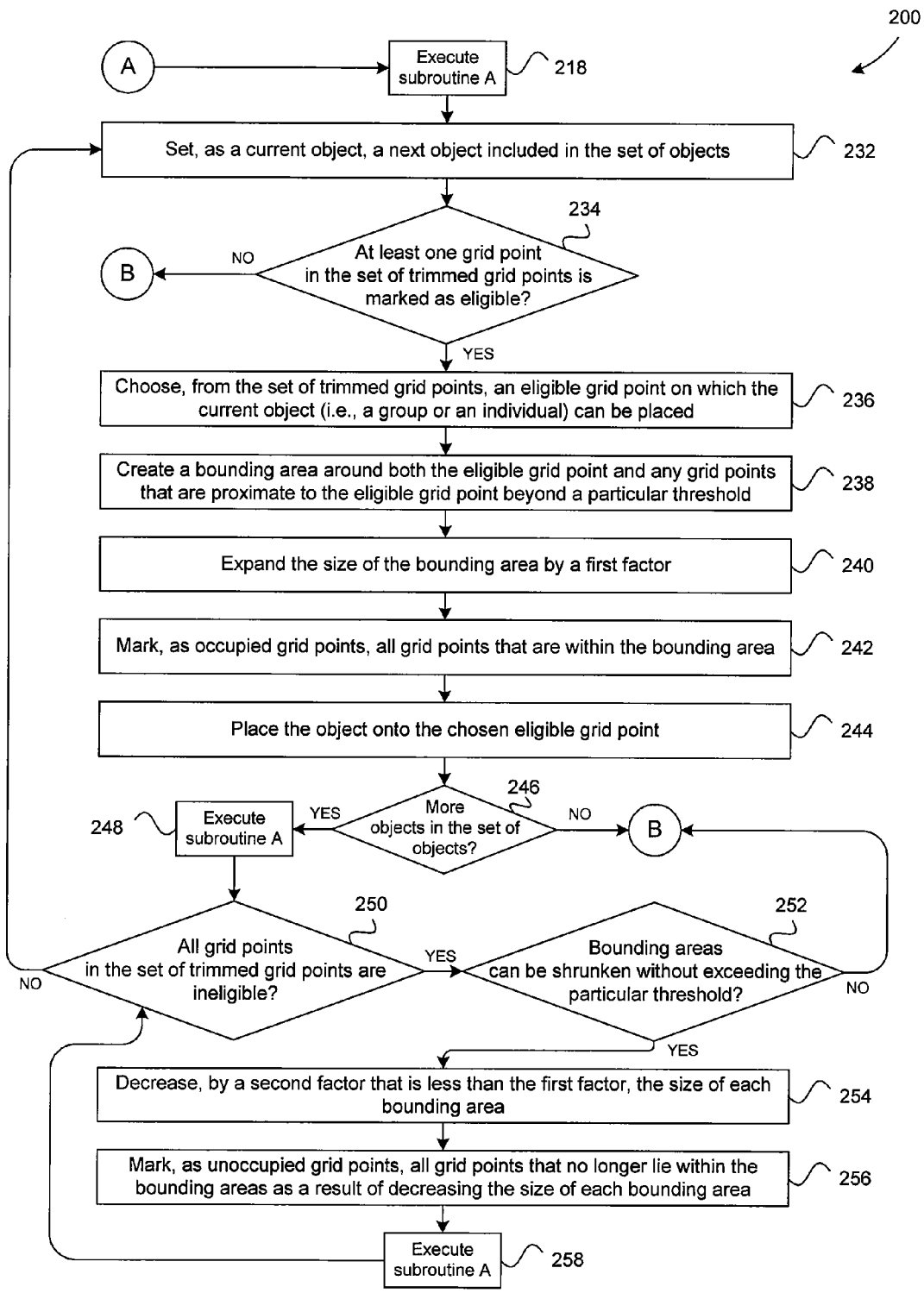
Figure 2C:
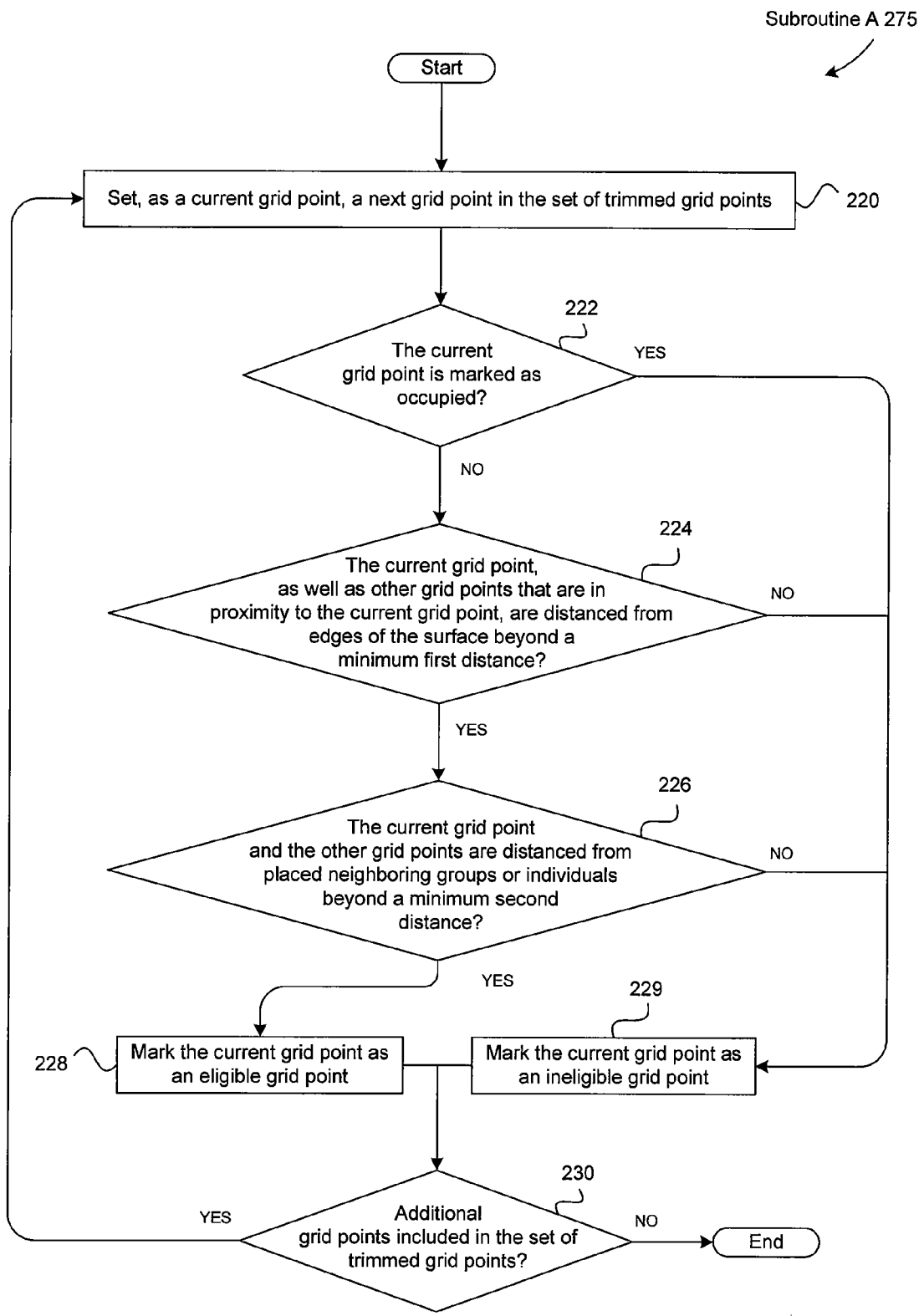

FIGS. 2A-2C illustrate a flow diagram of method steps for placing individuals and/or groups of individuals across a surface of a graphics object, according to one embodiment of the present invention. Although the method steps are described in conjunction with FIGS. 1 and 3A-3D, persons skilled in the art will understand that any system configured to perform the method steps, in any order, falls within the scope of the present invention.

As shown, a method 200 begins at step 202, where CAD application 108 receives a selection of a two-dimensional graphics object or a three-dimensional graphics object. In one embodiment, CAD application 108 receives the selection of the graphics object via GUI 110, which enables the user to browse for a particular data file in which the graphics object is stored. An example of such a graphics object is illustrated as shape 302 in FIG. 3A, which comprises a discontinuous surface (due to the hole in the center of shape 302).

At step 204, CAD application 108 establishes a plurality of grid points over a surface of the graphics object, each grid point being separated from one another by a particular distance. In one embodiment, the particular distance is half of a minimum allowable distance between two objects, e.g., an individual and a group of individuals. An illustration of such a plurality of grid points is included in FIG. 3A as grid points 300, which are established over the entire surface of shape 302.

Figure 3A:
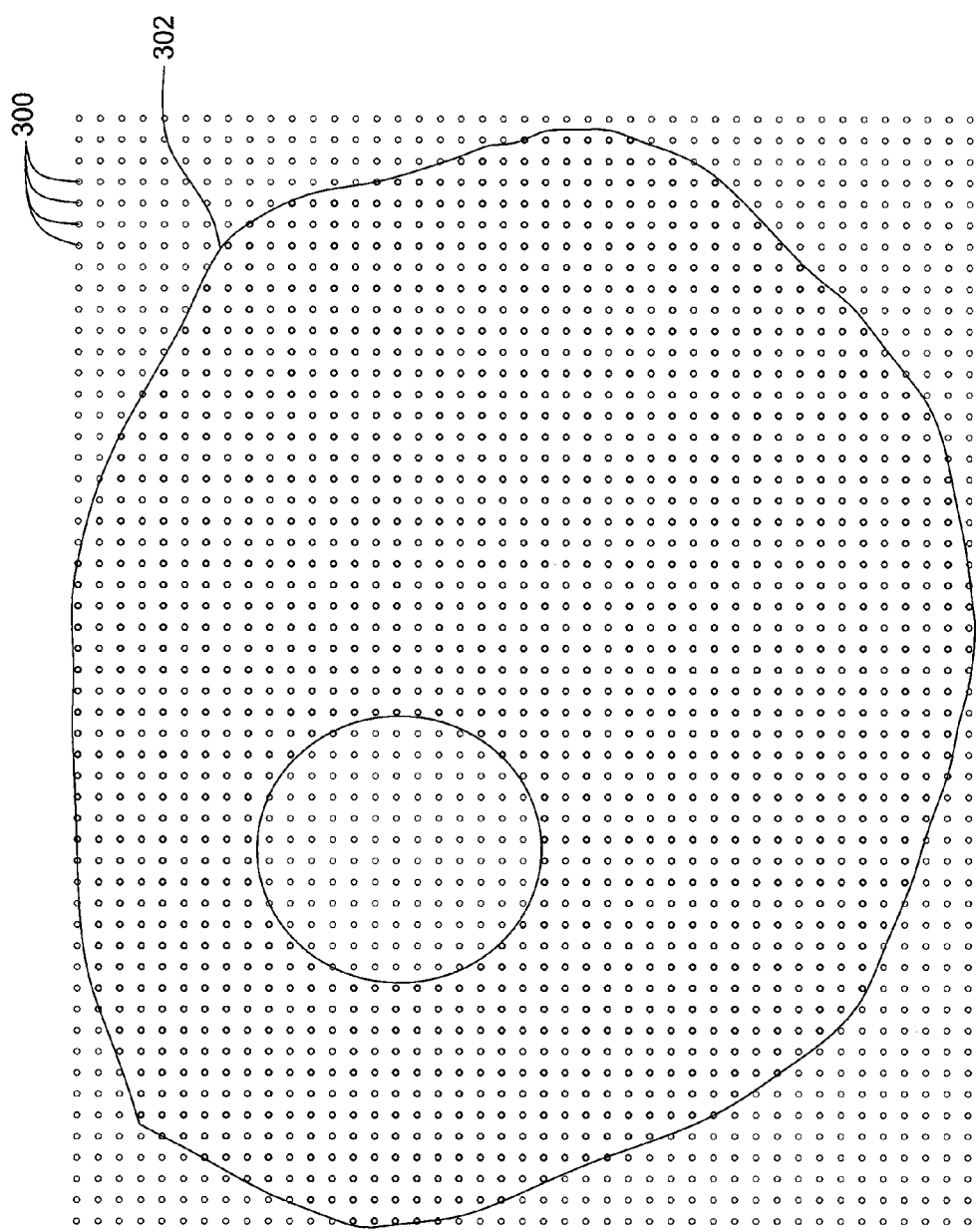
FIGS. 3A-3D are conceptual diagrams that illustrate the placement of both individuals and groups of individuals across a surface of a graphics object, according to one embodiment of the invention.
Figure 3B:
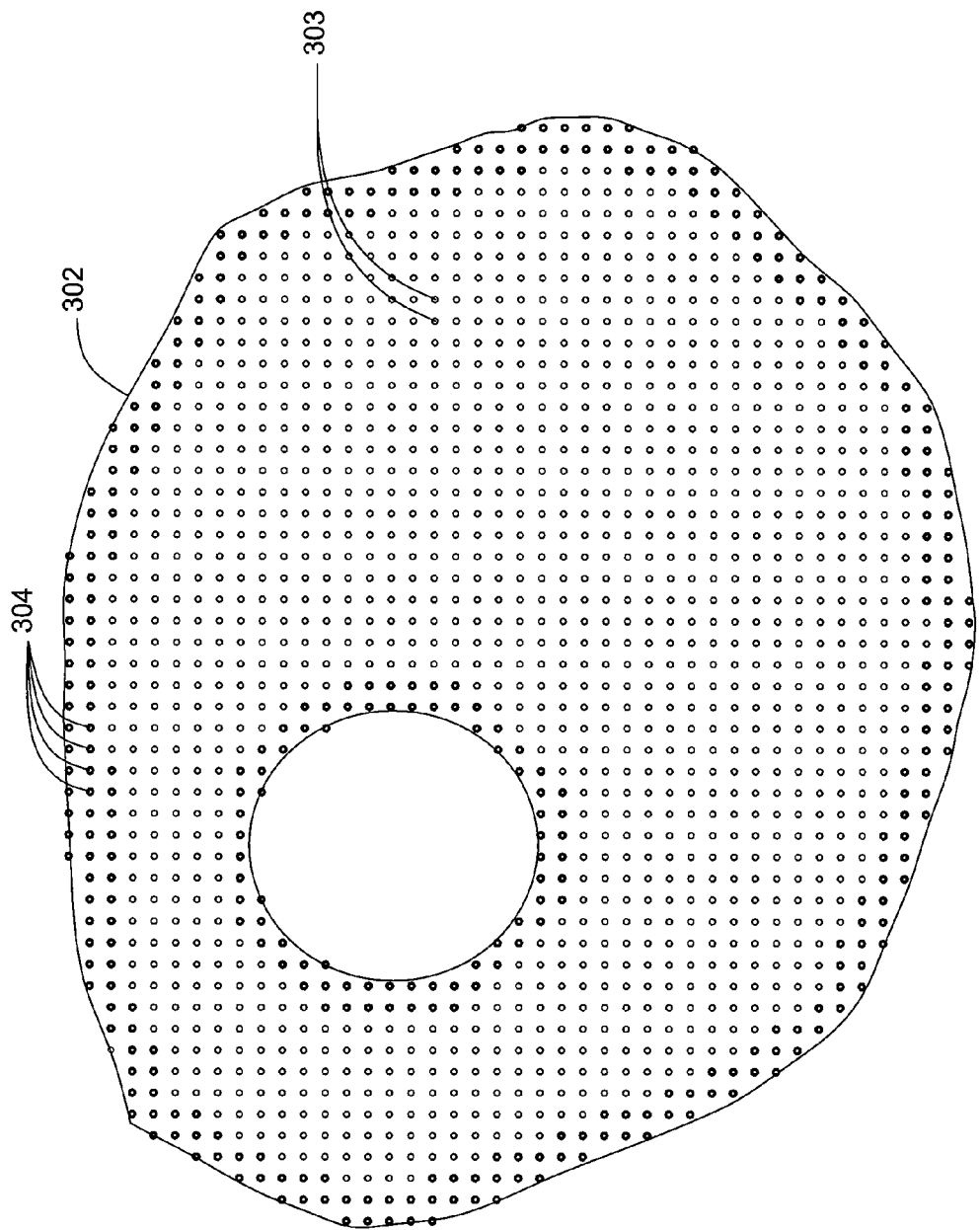

At step 206, CAD application 108 generates a set of trimmed grid points, the set of trimmed grid points including only grid points that lie within edges of the surface of the graphics object, e.g., grid points 303 and 304 in FIG. 3B. The grid points that are not included in the set of trimmed grid points are discarded since the individuals and/or groups of individuals should not be placed outside of the edges of the surface of the graphics object.

At step 208, CAD application 108 determines, for each grid point in the set of trimmed grid points, a distance between the grid point and an edge of the surface nearest to the grid point. In one embodiment, each grid point is implemented as a data object that stores any number of properties, one of which being a distance between the grid point and an edge of the surface of the graphics object that is closest to the grid point.

At step 210, CAD application 108 generates, based on received information, a set of individuals to be placed across the surface of the graphics object. In one embodiment, CAD application 108 analyzes the population density parameter, among other information and/or parameters described above in conjunction with FIG. 1, in order to determine how many individuals should be included in the set of individuals.

At step 212, CAD application 108 determines whether the information specifies that at least one group of individuals should be placed across the surface of the graphics object. In one embodiment, CAD application 108 makes this determination by analyzing the desired ratio of groups to individuals parameter described above. If, at step 212, CAD application 108 determines that the information specifies that at least one group of individuals should be placed, then method 200 proceeds to step 214.

Figure 3C:
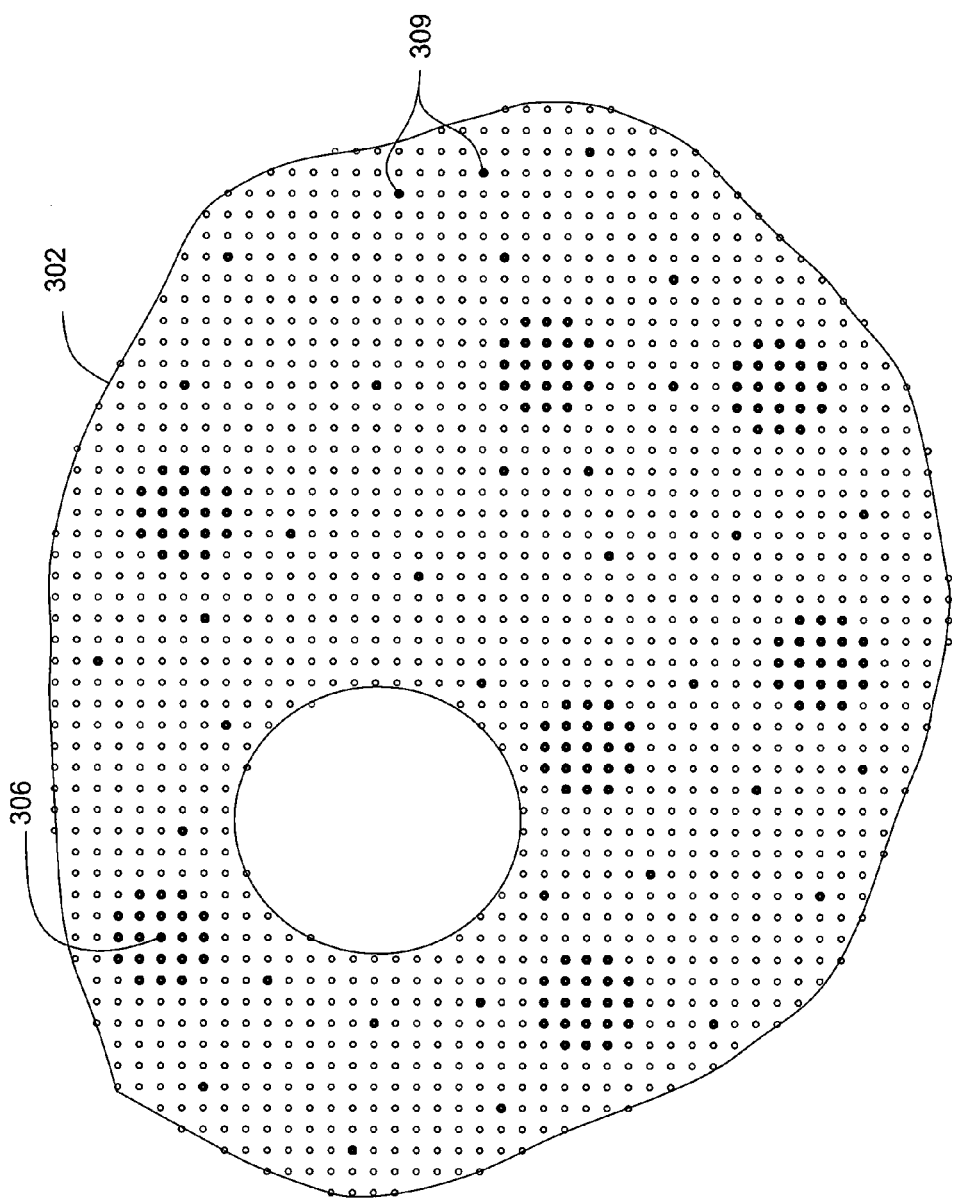

At step 214, CAD application 108 generates a set of groups based on the received information, e.g., the desired ratio of groups to individuals. The set of groups reflects an appropriate number of groups that should be placed across the surface of the graphics object based on the number of individuals in the set of individuals generated at step 210 as well as the desired ratio of groups to individuals. At step 216, CAD application 108 points a set of objects to the set of groups such that each object in the set of objects represents a different group of individuals in the set of groups. At step 218, CAD application 108 executes subroutine A, which is illustrated in FIG. 2C as subroutine A 275. As is described in further detail herein, subroutine A 275 is frequently executed throughout method 200 and serves to process and update each grid point in the set of trimmed grid points as a grid point that is either an eligible or an ineligible location for the placement of an individual or as a center point for a group of individuals. FIG. 3C illustrates a grid point 306 that is marked as an eligible location onto which a group of individuals can be placed.

As shown in FIG. 2C, subroutine A 275 begins at step 220, where CAD application 108 sets, as a current grid point, a next grid point in the set of trimmed grid points. In the first iteration of subroutine A 275, the next grid point is the first grid point included in the set of trimmed grid points. At step 222, CAD application 108 determines whether the current grid point is marked as occupied. In one embodiment, each grid point has a parameter associated therewith that maintains whether the grid point has been marked as a placement point for an individual or as a center point for a group of individuals. Because, during the first execution of subroutine A 275, no individuals or groups of individuals have been placed onto a grid point in the set of grid points, subroutine A 275 marks each grid point as not occupied. However, as described in further detail below, some grid points in the set of trimmed grid points are marked as occupied when an individual or group of individuals is placed thereon, thereby making those grid points ineligible for receiving other individuals or groups of individuals. Accordingly, if, at step 222, CAD application 108 determines that the current grid point is marked as occupied, then method 200 proceeds to step 229, where CAD application 108 marks the current grid point as an ineligible grid point. Otherwise, method 200 proceeds to step 224.

At step 224, CAD application 108 determines whether the current grid point, as well as other grid points that are proximate to the current grid point, are distanced from edges of the surface beyond a minimum first distance. FIG. 3B illustrates grid points 303, which are candidates for receiving an individual or a group of individuals. FIG. 3B also illustrates grid points 304, which are not candidates for receiving an individual or a group of individuals due to their closeness to an edge of the surface of the graphics object. In one embodiment, the minimum first distance is specified by a user. In another embodiment, the minimum first distance is determined by CAD application 108 based on other information, such as graphics objects that parallel or even define the edges of the surface. For example, the minimum first distance may be a small value when the edge of the surface is water, as opposed to a large value when the edge of the surface is a cliff.

Accordingly, if, at step 224, CAD application 108 determines that the current grid point, as well as other grid points that are proximate to the current grid point, are not distanced from edges of the surface beyond the minimum first distance, then method 200 proceeds to step 229, where the current grid point is marked as an ineligible grid point. Otherwise, method 200 proceeds to step 226.

At step 226, CAD application 108 determines whether the current grid point, as well as the other grid points that are proximate to the current grid point, are distanced from placed neighboring groups or individuals beyond a minimum second distance, which is either specified by a user or determined by CAD application 108 according to the information and/or parameters described herein. If, at step 226, CAD application 108 determines that the current grid point and the other grid points are distanced from placed neighboring groups or individuals beyond a minimum second distance, then method 200 proceeds to step 228, where CAD application 108 marks the current grid point as an eligible grid point.

At step 230, CAD application 108 determines whether additional grid points are included in the set of trimmed grid points, and, if so, method 200 proceeds back to step 220, whereupon method steps 220-230 are repeated until each grid point in the set of grid points is processed by CAD application 108. After each grid point in the set of grid points is processed by CAD application 108, method 200 proceeds to step 232, which is illustrated in FIG. 2B.

At step 232, CAD application 108 sets, as a current object, a next object included in the set of objects. Here, each object is a group of individuals if CAD application 108 determined at step 212 that the information specifies at least one group of individuals should be placed; otherwise, each object is an individual, as explained in further detail below at step 264.

At step 234, CAD application 108 determines whether at least one grid point in the set of trimmed grid points is marked as eligible, and, if so, method 200 proceeds to step 236. If CAD application 108 determines at step 234 that no eligible grid points are included in the set of trimmed grid points, then method 200 proceeds to step 260, which is described below in conjunction with FIG. 2A.

At step 236, CAD application 108 chooses, from the set of trimmed grid points, an eligible grid point on which the current object (i.e., a group or an individual) can be placed. In one embodiment, CAD application 108 chooses eligible grid points at random from the set of trimmed grid points. In another embodiment, CAD application 108 chooses the eligible grid points in according to a fixed order.

At step 238, CAD application 108 creates a bounding area around both the eligible grid point and any grid points that are proximate to the eligible grid point beyond a particular threshold. In one embodiment, CAD application 108 identifies grid points that are proximate to the eligible grid point and stores those grid points in an array that corresponds to the eligible grid point.

At step 240, CAD application 108 expands the size of the bounding area by a first factor. Assuming that an array is used to maintain grid points proximate to the eligible grid point, step 240 involves CAD application 108 adding additional grid points to the array that are proximate to the eligible grid point beyond an increased factor of the particular threshold.

At step 242, CAD application 108 marks, as occupied grid points, all grid points that are within the bounding area. At step 244, CAD application 108 places the object onto the chosen eligible grid point. In one embodiment, each grid point, when implemented as an object, includes a property that points to either an individual or a group of individuals, thereby indicating that the individual or the group of individuals is to be placed on that grid point, e.g., when the individuals are rendered into a graphics scene that includes the graphics object.

At step 246, CAD application 108 determines whether there are more objects in the set of objects, and, if so, then method 200 proceeds to step 248. Otherwise, method 200 returns to step 260 in FIG. 2A, which is described below. At step 248, CAD application 108 executes subroutine A 275 according to the techniques described above in conjunction with FIG. 2C. Re-executing subroutine A 275 updates the set of trimmed grid points to account for the individual or group of individuals that was placed onto the surface of the graphics object at step 244, which affects the eligibility or ineligibility of grid points in the set of trimmed grid points for receiving a next individual or a next group of individuals.

When subroutine A 275 returns, method 200 proceeds to step 250, where CAD application 108 determines whether all grid points in the set of trimmed grid points are ineligible, which occurs when there are no eligible grid points onto which a next individual or group of individuals can be properly placed. However, since the bounding areas of groups of individuals—if any—were expanded by the first factor at step 240, then there may be a way for CAD application 108 to reduce the size of the bounding areas to establish eligible grid points while still leaving enough room to place an appropriate number of individuals into the groups of individuals.

Accordingly, at step 252, CAD application 108 determines whether the bounding areas can be shrunken without exceeding the particular threshold identified at step 238, which is the minimum allowable bounding area size. If, at step 252, CAD application 108 determines that the bounding areas can be shrunken without exceeding the particular threshold identified at step 238, then method 200 proceeds to step 254.

At step 254, CAD application 108 decreases, by a second factor that is less than the first factor, the size of each bounding area of each grid point on which an individual or a group of individuals has been placed. Assuming that each grid point implements an array to keep track of the grid points encompassed by the bounding area associated therewith, step 254 would involve CAD application 108 removing from the array any grid points that no longer lie within the bounding areas as a result of decreasing the size of each bounding area.

At step 256, CAD application 108 marks, as unoccupied grid points, all grid points that no longer lie within the bounding areas as a result of decreasing the size of each bounding area. At step 258, CAD application 108 executes subroutine A, which updates the grid points in the set of grid points to be eligible or ineligible grid points in order to reflect the decreased the size of each bounding area. Upon completion of subroutine A 275, method 200 returns to step 250 described above, where method steps 252-258 are repeated so long as at least one individual or group of individuals needs to be placed onto the surface of the object, there are no eligible grid points onto which the at least one individual or group of individuals can be placed, and the bounding areas can be further shrunken without exceeding the particular threshold of step 238.

Accordingly, when at least one eligible grid point is identified, method steps 232-258 are repeated until each object (i.e., individual or group of individuals) is placed across the surface of the graphics object. In the event that not all of the individuals or groups of individuals can be properly placed, method 200 terminates, and, in one embodiment, CAD application 108 reports the particular issue that is causing the termination, e.g., too high of a population density for the size of the surface of the graphics object.

When CAD application 108 determines at step 246 that all objects (i.e., individuals or groups of individuals) in the set of objects have placed onto an eligible grid point, method 200 proceeds to step 260 in FIG. 2A, where CAD application 108 determines whether the objects in the set of objects point to groups or individuals. If, at step 260, CAD application 108 determines that the objects in the set of objects point to groups, then method 200 proceeds to step 262, where CAD application 108 removes from the set of individuals any individuals that were placed into a group of individuals.

At step 264, CAD application 108 points the set of objects to the set of individuals such that each object in the set of objects represents a different individual in the set of individuals. Method 200 then proceeds back to step 218, whereupon the method steps included in FIGS. 2B and 2C are carried out by CAD application 108 according to the techniques described above. As a result, individuals in the set of individuals are placed onto eligible grid points according to the information and parameters described herein. FIG. 3C illustrates example grid points 309 that represent grid points onto which an individual has been selected for placement.

Figure 3D:
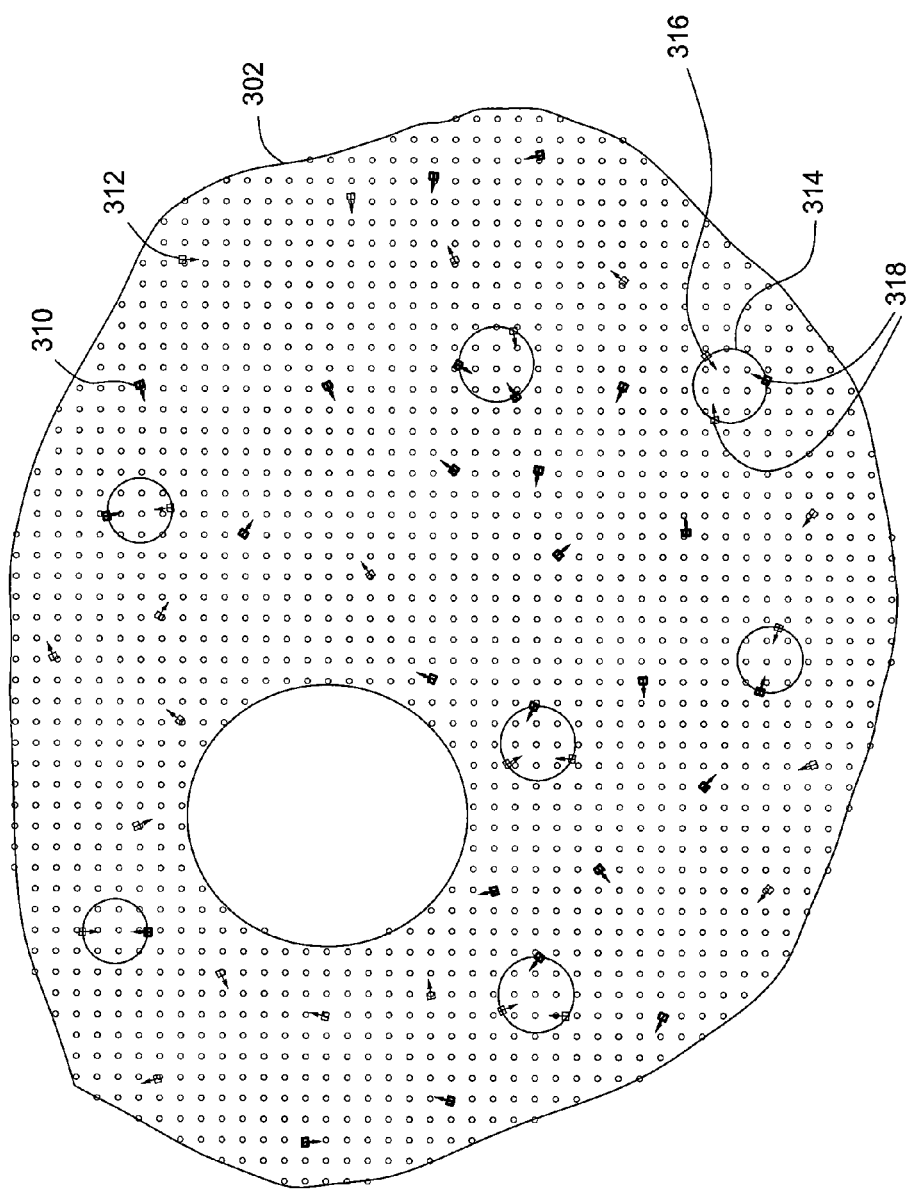

Finally, at step 268, CAD application 108, for each individual on the surface, alone or in a group, orients the individual based on various parameters associated with the individual. FIG. 3D illustrates example orientations of individuals and groups of individuals that are placed onto the graphics object 302 according to the various steps that occur throughout the examples illustrated in FIGS. 3A-3C. In one embodiment, CAD application 108 orients the individuals according to the parameters described herein, e.g., the desired ratio of males to females, and/or orientations of individuals (e.g., number of individuals who talk vs. individuals who listen). In the example illustrated in FIG. 3D, individual 310 represents a male individual and individual 312 represents a female individual, each of whom is alone on the surface of the graphics object and not part of any group. Also shown is a group 314, which comprises two individuals 318 who are oriented to listen to a female individual 316 who is speaking.

As set forth above, method 200 enables CAD application 108 to automatically and dynamically place individuals and/or groups of individuals across a surface of a selected graphics object. In some cases, a user may desire to specify particular regions across the surface of the selected graphics object in order to establish certain areas of the surface that should not receive individuals or groups of individuals.

Figure 4A:
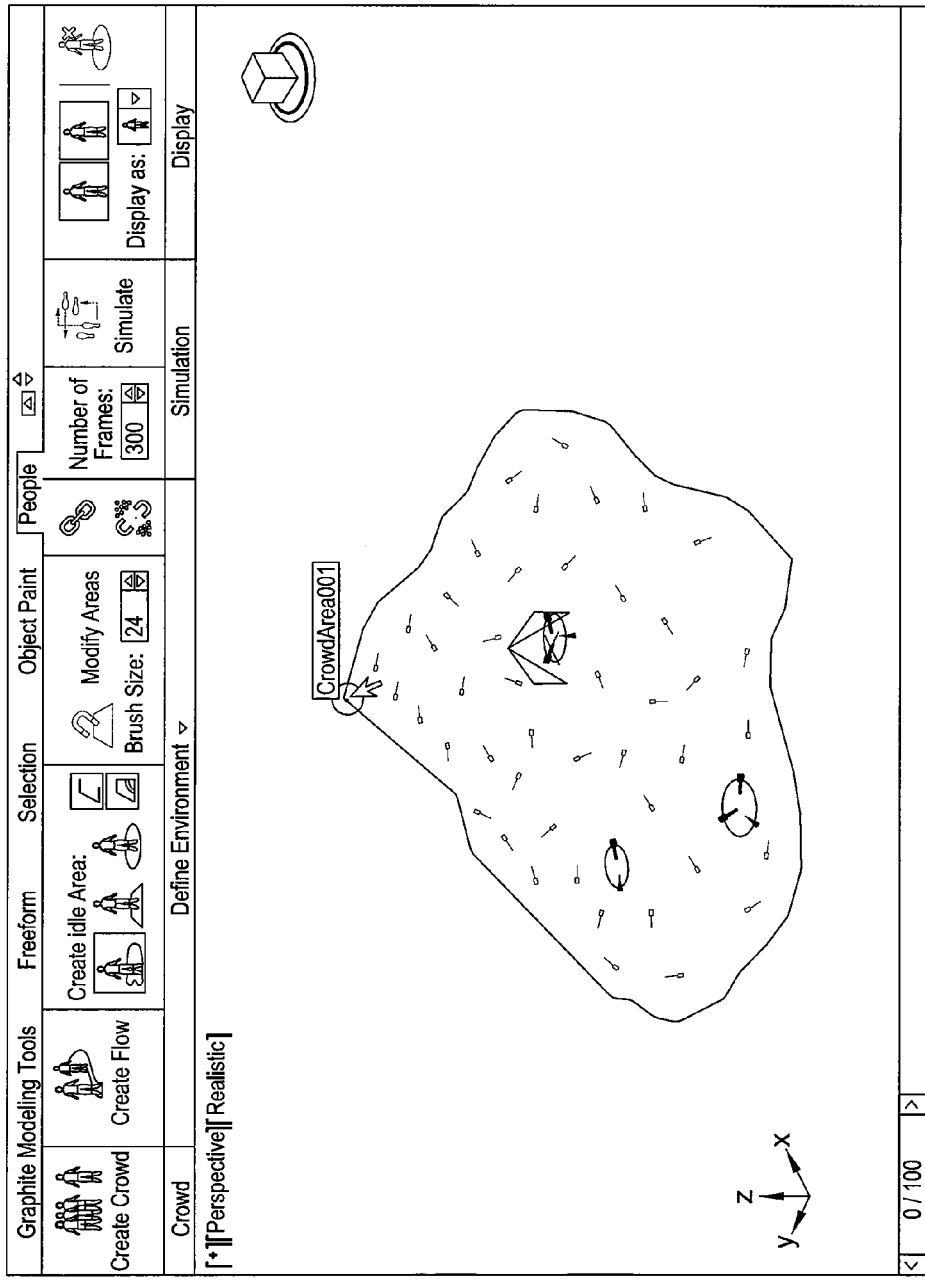
FIGS. 4A-4C are conceptual diagrams that illustrate an example graphical user interface (GUI) that enables a user to define one or more regions within a surface of a graphics object across which individuals and/or groups of individuals are placed, according to one embodiment of the invention.
Figure 4B:
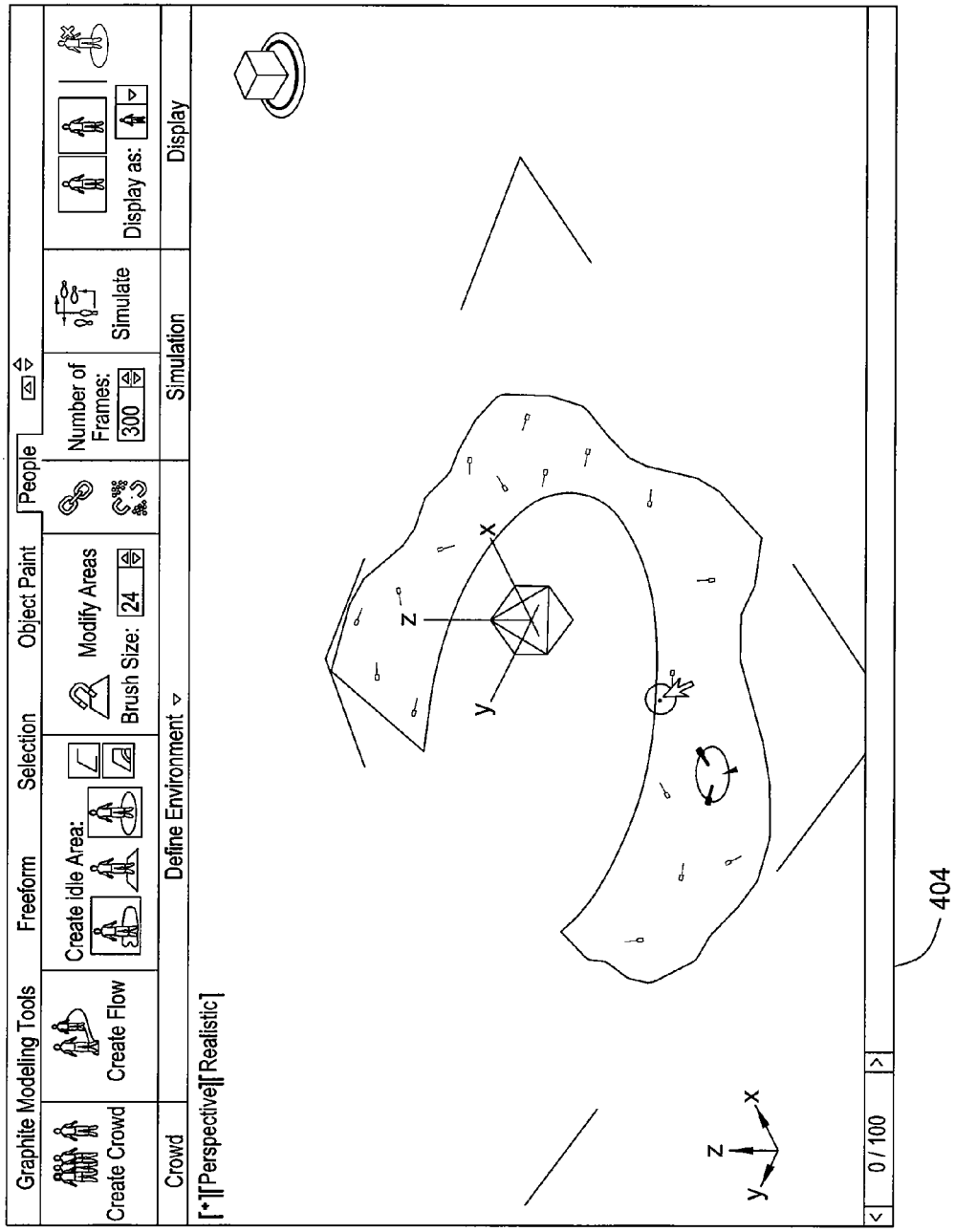
Figure 4C:
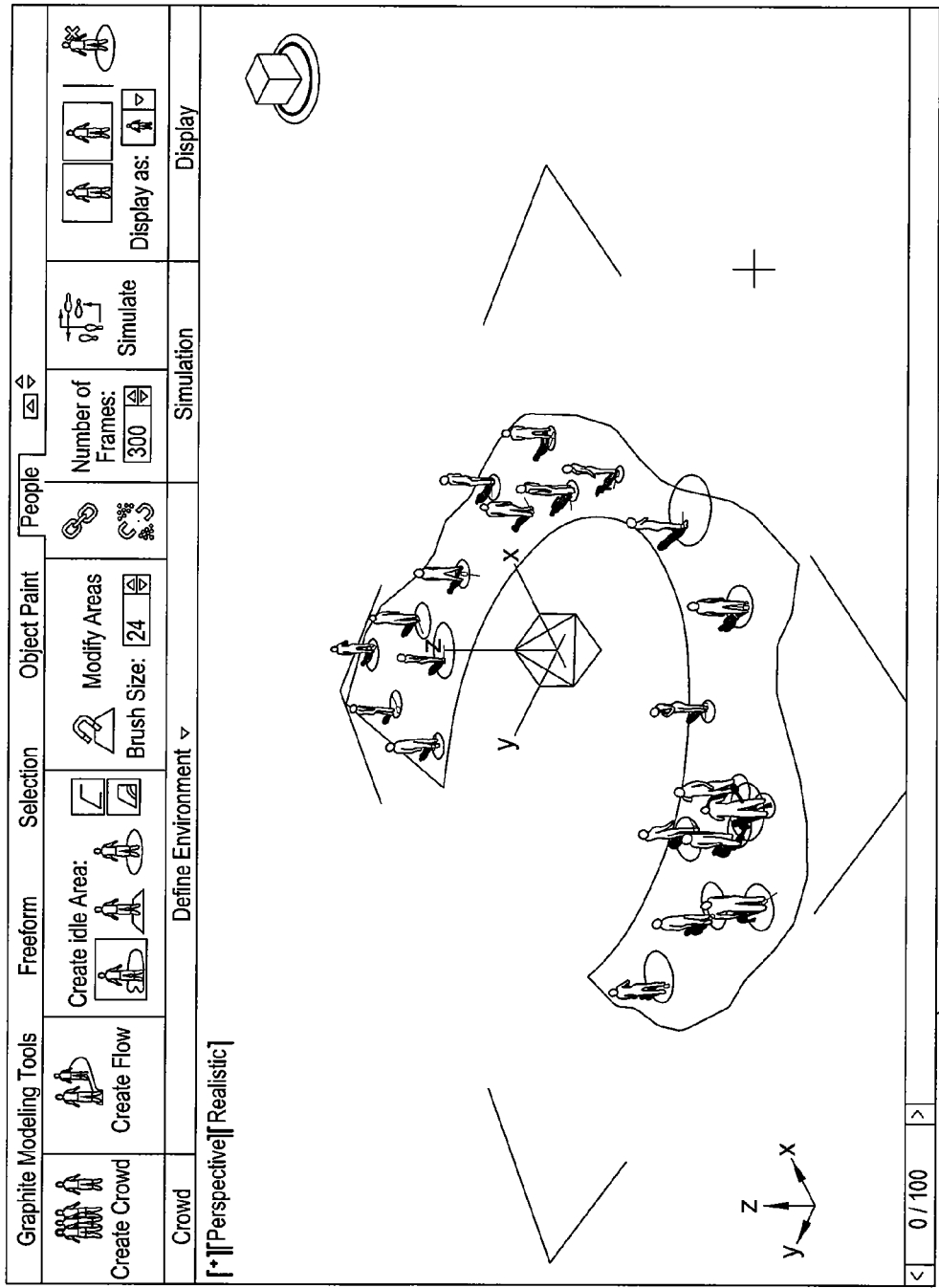

FIGS. 4A-4C are conceptual diagrams that illustrate an example implementation of GUI 110 that enables a user to define one or more regions within a surface of a graphics object across which individuals and/or groups of individuals are to be placed, according to one embodiment of the invention. In particular, FIG. 4A illustrates an example interface 402 wherein a particular graphics object has been selected to receive individuals as well as groups of individuals. In this example, CAD application 108 distributes the individuals and the groups of individuals according to method 200 described above in conjunction with FIGS. 2A-2C and FIGS. 3A-3D.

FIG. 4B illustrates an example interface 402 after a user selects a modification tool that enables him or her to establish particular regions within the surface of the graphics object onto which the individuals and the groups of individuals should be redistributed. As shown in FIG. 4B, a region is established and causes a center portion of the surface of the graphics object as well as a side portion of the surface of the graphics object to be eliminated. In one embodiment, establishing such a region triggers CAD application 108 to re-execute method 200 in order to provide an updated display of how the individuals and groups of individuals are placed across the surface of the graphics object.

Finally, FIG. 4C illustrates an example interface 406 that represents GUI 110 after the individuals and groups of individuals have been placed across the surface of the graphics object and oriented according to the techniques described herein. As shown, neither individuals nor groups of individuals are placed onto the eliminated areas of the surface of the graphics object. FIG. 4C also illustrates an example of a group that comprises three individuals, one of whom is talking, and two of whom are listening to the talking individual. Thus, embodiments of the invention enable a user to not only fine-tune how individuals and/or groups of individuals are placed across a surface of a graphics object, but also to fine-tune specific regions of the surface of the graphics object across which the individuals and/or groups of individuals should be placed.

In sum, individuals and/or groups of individuals are automatically distributed across a surface, or particular regions of the surface, of a two-dimensional or a three-dimensional graphics object. Grid points are established over the surface of the graphics object, where each grid point in the plurality of grid points is located either inside or outside the surface, and all grid points that are located outside of the surface are removed. According to the techniques described herein, each remaining grid point is marked as an eligible area or an ineligible area onto which individuals or groups of individuals can placed. An eligible grid point is then selected as an area onto which an individual or a group of individuals should be placed.

One advantage of the disclosed technique is that individuals and/or groups of individuals are automatically distributed across a surface of a graphics object of any shape or form. Another advantage is that edges of the surface of the graphics object are analyzed to ensure no individual or group of individuals is placed too closely to an edge of the surface, which helps prevent each individual and group of individuals, when subsequently animated after being placed across the surface, from exceeding the boundaries of the surface of the graphics object. Yet another advantage of the disclosed method is that a graphical preview displays in real-time how individuals and/or groups of individuals will be placed across the surface of the graphics object, and is dynamically updated in response to any changes in information on which placing the individuals and/or groups of individuals is based.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

What is claimed is:

1. A computer-implemented method for placing objects across a surface of a graphics object, the method comprising:
    establishing a first plurality of grid points over the surface of the graphics object, wherein each grid point in the plurality of grid points is located either inside or outside the surface;
    establishing a second plurality of grid points that includes only grid points in the first plurality of grid points that are located inside the surface;
    marking, via a processor, each grid point in the second plurality of grid points as an eligible area or an ineligible area onto which objects can be placed, wherein a grid point in the second plurality of grid points is marked as an eligible area when the grid point is located at least at a first threshold distance from any neighboring object that has been placed onto a grid point;
    selecting from the second plurality of grid points a grid point that is marked as an eligible area; and
    placing an object onto the selected grid point.

2. The method of claim 1, wherein a grid point in the second plurality of grid points is marked as an eligible area when the grid point:
    is not marked as occupied by an object,
    is located at least at a second threshold distance from an edge of the surface that is closest to the grid point.

3. The method of claim 2, wherein placing the object onto the selected grid point comprises marking the selected grid point as occupied by the object.

4. The method of claim 3, wherein placing the object onto the selected grid point further comprises:
    establishing a bounding area around the selected grid point and any grid points that are proximate to the selected grid point within a first threshold;
    increasing the size of the bounding area by a first factor; and
    marking each grid point that lies within the increased-size bounding area as occupied.

5. The method of claim 4, further comprising:
    determining that all grid points in the second plurality of grid points are marked as ineligible areas onto which objects can be placed;
    decreasing the coverage of the bounding area around the selected grid point by a second factor that is less than the first factor; and
    marking each grid point that no longer lies within the bounding area as unoccupied by an object.

6. The method of claim 1, further comprising:
    receiving at least one user-defined region of the surface; and
    removing from the second plurality of grid points all grid points that lie within the at least one user-defined region of the surface.

7. The method of claim 1, wherein the grid point marked as an eligible area is selected at random from the second plurality of grid points.

8. The method of claim 1, wherein the surface is a surface of a three-dimensional graphics object.

9. A non-transitory computer readable medium for storing instructions that, when executed by a processor, cause the processor to place objects across a surface of a graphics object, by performing the steps of:
    establishing a first plurality of grid points over the surface of the graphics object, wherein each grid point in the plurality of grid points is located either inside or outside the surface;
    establishing a second plurality of grid points that includes only grid points in the first plurality of grid points that are located inside the surface;
    marking each grid point in the second plurality of grid points as an eligible area or an ineligible area onto which objects can be placed, wherein a grid point in the second plurality of grid points is marked as an eligible area when the grid point is located at least at a first threshold distance from any neighboring object that has been placed onto a grid point;
    selecting from the second plurality of grid points a grid point that is marked as an eligible area; and
    placing an object onto the selected grid point.

10. The computer readable medium of claim 9, wherein a grid point in the second plurality of grid points is marked as an eligible area when the grid point:
    is not marked as occupied by an object,
    is located at least at a second threshold distance from an edge of the surface that is closest to the grid point, and
    is located at a second threshold distance from any neighboring object that has been placed onto a grid point.

11. The computer readable medium of claim 10, wherein placing the object onto the selected grid point comprises marking the selected grid point as occupied by the object.

12. The computer readable medium of claim 11, wherein placing the object onto the selected grid point further comprises:
    establishing a bounding area around the selected grid point and any grid points that are proximate to the selected grid point within a first threshold;
    increasing the size of the bounding area by a first factor; and
    marking each grid point that lies within the increased-size bounding area as occupied.

13. The computer readable medium of claim 12, further comprising:
    determining that all grid points in the second plurality of grid points are marked as ineligible areas onto which objects can be placed;
    decreasing the coverage of the bounding area around the selected grid point by a second factor that is less than the first factor; and
    marking each grid point that no longer lies within the bounding area as unoccupied by an object.

14. The computer readable medium of claim 9, further comprising:
    receiving at least one user-defined region of the surface; and
    removing from the second plurality of grid points all grid points that lie within the at least one user-defined region of the surface.

15. The computer readable medium of claim 9, wherein the grid point marked as an eligible area is selected at random from the second plurality of grid points.

16. The computer readable medium of claim 9, wherein the surface is a surface of a three-dimensional graphics object.

17. A computer system, comprising:
a memory; and
a processor configured to place objects across a surface of a graphics object, by performing the steps of:
establishing a first plurality of grid points over the surface of the graphics object, wherein each grid point in the plurality of grid points is located either inside or outside the surface;
establishing a second plurality of grid points that includes only grid points in the first plurality of grid points that are located inside the surface;
marking each grid point in the second plurality of grid points as an eligible area or an ineligible area onto which objects can be placed, wherein a grid point in the second plurality of grid points is marked as an eligible area when the grid point is located at least at a first threshold distance from any neighboring object that has been placed onto a grid point;
selecting from the second plurality of grid points a grid point that is marked as an eligible area; and
placing an object onto the selected grid point.

18. The computer system of claim 17, wherein a grid point in the second plurality of grid points is marked as an eligible area when the grid point:
is not marked as occupied by an object,
is located at least at a second threshold distance from an edge of the surface that is closest to the grid point, and
is located at a second threshold distance from any neighboring object that has been placed onto a grid point.

19. The computer system of claim 18, wherein placing the object onto the selected grid point comprises marking the selected grid point as occupied by the object.

20. The computer system of claim 19, wherein placing the object onto the selected grid point further comprises:
establishing a bounding area around the selected grid point and any grid points that are proximate to the selected grid point within a first threshold;
increasing the size of the bounding area by a first factor; and
marking each grid point that lies within the increased-size bounding area as occupied.

* * * * *